(12) United States Patent
Vauchel et al.

(10) Patent No.: US 8,753,072 B2
(45) Date of Patent: Jun. 17, 2014

(54) TURBOJET ENGINE NACELLE

(75) Inventors: Guy Bernard Vauchel, Harfleur (FR); Jean-Philippe Dauguet, Tournefeuille (FR); Stephanie Beilliard, Toulouse (FR)

(73) Assignee: Aircelle, Gonfreville l'Orcher (FR)

( * ) Notice: Subject to any disclaimer, the term of this patent is extended or adjusted under 35 U.S.C. 154(b) by 543 days.

(21) Appl. No.: 13/121,749

(22) PCT Filed: Sep. 25, 2009

(86) PCT No.: PCT/FR2009/001141
§ 371 (c)(1),
(2), (4) Date: Mar. 30, 2011

(87) PCT Pub. No.: WO2010/037923
PCT Pub. Date: Apr. 8, 2010

(65) Prior Publication Data
US 2011/0182727 A1    Jul. 28, 2011

(30) Foreign Application Priority Data

Oct. 1, 2008 (FR) ..................... 08 05421

(51) Int. Cl.
*F01D 5/00* (2006.01)
*F01D 25/04* (2006.01)

(52) U.S. Cl.
USPC .......................................... 415/119; 415/196

(58) Field of Classification Search
USPC ......... 415/9, 196, 197, 214.1, 119; 244/53 R, 244/53 B, 110 B, 1 N
See application file for complete search history.

(56) References Cited

U.S. PATENT DOCUMENTS

| 4,688,757 A |   | 8/1987 | Cook et al. |
|---|---|---|---|
| 5,609,313 A | * | 3/1997 | Cole et al. ....................... 244/54 |
| 6,179,249 B1 | * | 1/2001 | Canadas ...................... 244/53 R |
| 7,383,679 B2 | * | 6/2008 | Porte et al. ................... 60/226.1 |
| 7,703,716 B2 | * | 4/2010 | Bulin ........................... 244/53 R |

FOREIGN PATENT DOCUMENTS

| EP | 1495963 B1 | 1/2005 |
|---|---|---|
| FR | 2323883 A | 4/1977 |
| FR | 2757823 A1 | 7/1998 |
| FR | 2906568 A1 | 4/2008 |

OTHER PUBLICATIONS

International Search Report issued Feb. 2, 2010 in Application No. PCT/FR2009/001141; citing FR 2906568, FR 2323883 and FR 2757823.

* cited by examiner

*Primary Examiner* — Edward Look
*Assistant Examiner* — Christopher J Hargitt
(74) *Attorney, Agent, or Firm* — Brinks Gilson & Lione (57) ABSTRACT

A turbojet engine nacelle includes an air intake structure having a longitudinal outer panel incorporating an air intake lip, a middle structure to which the air intake structure is attached, at least one inner panel including an acoustic shroud, rails guiding the outer panel able to allow a rectilinear movement of the outer panel, and a reinforcing member to react the mechanical loads of the guide rails. In particular, the reinforcing member reacts the loads of the guide rails beyond a predetermined deformation of the guide rails.

14 Claims, 5 Drawing Sheets

TURBOJET ENGINE NACELLE

TECHNICAL FIELD

The present invention relates to a turbojet engine nacelle comprising an air intake structure able to channel a flow of air towards a fan of the turbojet engine and a middle structure intended to surround said fan and to which the air intake structure is attached.

BACKGROUND

In general, an aircraft nacelle has a structure comprising an air intake structure, a middle structure, and a downstream section. The term "downstream" here refers to the direction corresponding to the direction of the cold air flow penetrating the turbojet engine. The term "upstream" designates the opposite direction.

The air intake structure is situated upstream of the turbojet engine used to propel the aircraft. Downstream of the air intake structure, the middle structure is intended to surround a fan of the turbojet engine. Still further downstream is the downstream section generally housing thrust reverser means intended to surround the combustion chamber of the turbojet engine. The nacelle ends with a jet nozzle whereof the outlet is situated downstream of the turbojet engine.

The air intake structure comprises, on one hand, an air intake lip and, on the other hand, a downstream structure on which the lip is fastened. The air intake lip is adapted to allow optimal air collection towards the turbojet engine of the air necessary to power the fan and the internal compressors of the turbojet engine. The downstream structure is intended to suitably channel the air towards the vanes of the fan. This downstream structure generally includes an outer panel and an inner panel. The inner panel includes an acoustic shroud making it possible to attenuate the noise generated by the turbojet engine as well as the vibrations of the structures. The downstream structure and the air intake lip are fastened upstream of a casing of the fan belonging to the middle structure of the nacelle.

Depending on the relative temperature and humidity conditions on the ground or in flight, ice may form on the profile of the lip, in particular at the inner profile. This ice formation can be dangerous for the mechanical operation of the fixed and rotary parts of the turbojet engine and can cause a decrease in performance. Deicing systems for this part of the air intake lip have therefore been developed to resolve this problem. Examples include documents U.S. Pat. No. 4, 688, 757 and EP 1 495 963 in particular.

Figure 1:
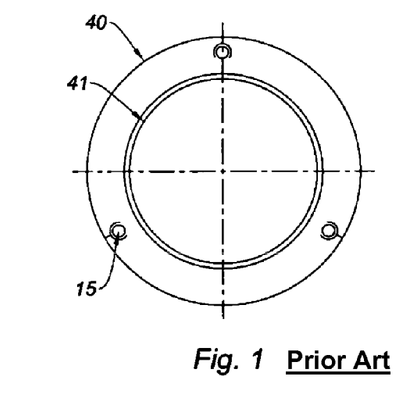
FIGS. 1 and 2 are transverse cross-sections of a nacelle of the prior art comprising a guide means.

It is known to perform maintenance operations on this equipment housed inside the air intake structure by sliding the outer panel 40 incorporating the air intake lip upstream of the middle structure 5 by guide means 15 (see FIG. 1). Generally, such guide means 15 assume the form of a system of rails.

Figure 2:
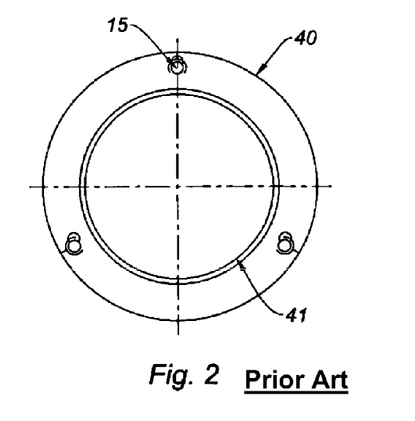

However, the guide means 15, in particular the rails, tend to deform during the transition from the closing position to the opening position (see FIG. 2). "Opening position" here refers to the configuration in which the air intake structure is translated in the upstream direction. The opening position corresponds to a configuration where the aircraft is on the ground for maintenance. Conversely, "closing position" here refers to the configuration in which the air intake lip is attached to the upstream end of the inner panel(s). The closing position corresponds to a configuration in which the aircraft is able to fly.

In the opening position, the guide means, in particular the system of rails, bears the mass of the moving assembly, which is generally greater than the bending strength of the rails. As a result, as shown in FIG. 2, there is a deformation of the guide means 15 that amounts, in the case of rail systems, to bending thereof relative to their axis. The deformation can also be accentuated by external factors such as the wind. Such a deformation makes the opening maneuver more difficult.

Moreover, there is a risk of the upstream end of the rails being used as a ladder rung by an operator, further accentuating the deformation.

One aim of the present invention is therefore to provide a nacelle limiting the deformation of the guide means.

BRIEF SUMMARY

To that end, according to a first aspect, the invention relates to a turbojet engine nacelle comprising:
  an air intake structure able to channel a flow of air towards a fan of the turbojet engine and comprising at least one longitudinal outer panel incorporating an air intake lip;
  a middle structure intended to surround said fan and to which the air intake structure is attached in such a way as to ensure aerodynamic continuity,
  at least one inner panel comprising an acoustic shroud, fixed at its downstream end to an upstream end of the middle structure forming therewith a fixed structure of the nacelle, and
  means of guiding the outer panel(s) able to allow a substantially rectilinear movement of the outer panel in the upstream direction of the nacelle so as to be able to open the air intake structure,
remarkable in that it comprises reinforcing means designed to react the mechanical loads of the guide means beyond a predetermined deformation thereof as the air intake structure opens.

The nacelle according to the present invention makes it possible to limit the deformation of the guide means to a predetermined maximum deformation. This movement limitation applies particularly to the upstream ends of the guide means that have a more significant tendency to deform, in particular to bend. Indeed, the reinforcing means react the mechanical loads beyond a certain threshold in the opening position, which allows the guide means to perform its guiding function more effectively.

Moreover, said reinforcing means of the nacelle according to the invention can advantageously only react the loads when a deformation occurs, i.e. the original shape of the guiding means has been altered.

Indeed, during the first uses where the guide means is able to withstand the loads, the reinforcing means do not bother the operation of said guide means.

Moreover, the nacelle according to the invention enables a better manufacturing limit where the reinforcing means are able to absorb any misalignment of the guide means due to the manufacturing thereof.

According to other features of the invention, the nacelle according to the invention includes one or several of the following optional features, considered alone or according to all possible combinations:
  the predetermined deformation is in at least one direction belonging to a plane substantially perpendicular to the main direction of the guide means,
  the reinforcing means have, between them or with an element of the nacelle, a non-zero spacing in the idle position, which allows a contact zone in case of excessive load on the guide means without requiring the creation of an interface area and also without load transmission from the guide means to the inner panel, in particular the acoustic shroud during flight, the reinforcing means comprise a protruding member fastened on the inner panel and having a non-zero spacing with the guide means in the idle position, the reinforcing means are fastened on the inner panel in the shape of an inverted L, the guide means having a non-zero spacing with the lateral portion of the L in the idle position, which makes it possible to avoid any fastening on the inner panel, the reinforcing means have a load reacting portion with a shape substantially complementary to the guide means, said portion having a non-zero spacing in the idle position with the guide means, which makes it possible to react the loads in several directions of the space, the reinforcing means comprise a protruding member fastened on the guide means and a lug fastened on the inner panel, said protruding member being mounted opposite the lug with a non-zero spacing in the idle position, which makes it possible to prevent structural fastenings on the inner panel, in particular the acoustic shroud so as not to alter the surface enabling the acoustic absorption, the reinforcing means comprise a first member fixed on the outer panel and able to move on a ramp mounted on the inner panel, which makes it possible to substitute for a significant deformation of the guide means, in particular the buckling of the rails, the first member and the ramp have a substantially zero spacing, which makes it possible to accompany and support, during a maneuvering phase, the mobile structure, the outer panel, relative to the stationary structure, the middle structure, the end comprises a roller able to roll on the ramp, which allows movement limiting the friction in case of load, the ramp comprises a stop at the upstream end, which makes it possible to prevent the end from falling from the upstream ramp, which would risk still further damaging the guide means, the reinforcing means comprise a first stop member mounted on the guide means and at least one second stop member mounted on the inner panel, said first and second stop members being connected using a connection capable of deforming to react the loads undergone by the guide means, which makes it possible to bear or take into account any movement coming from any direction of the space, the connecting means is a connecting rod, in particular formed in a metal piece, which makes it possible not to alter the position of the guide means and to directly react the loads undergone by the outer panel, the connecting rod comprises an elastically deformable member, which makes it possible to obtain a more significant absorption of the loads undergone by the outer panel.

BRIEF DESCRIPTION OF THE DRAWINGS

The invention will be better understood upon reading the following non-limiting description, done in reference to the appended figures.

DETAILED DESCRIPTION

Figure 3:
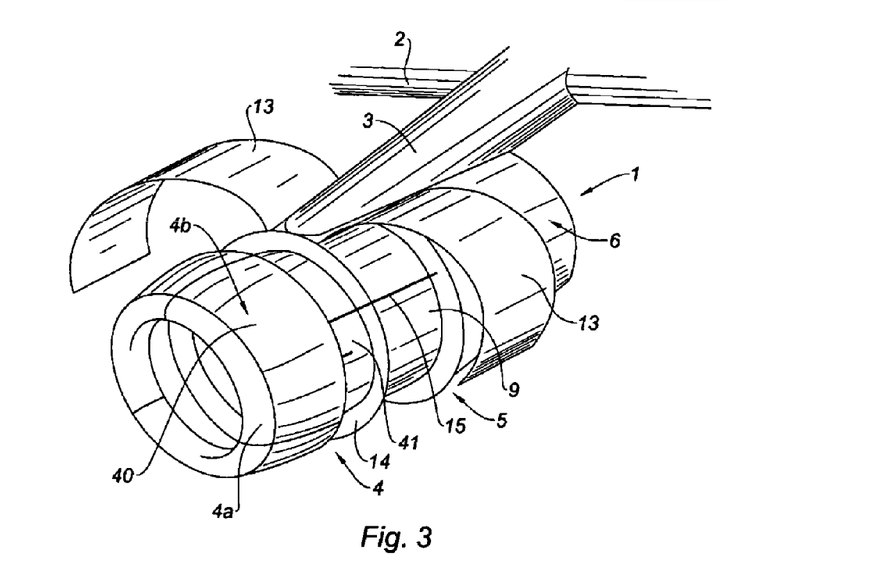
FIG. 3 is a perspective view of the nacelle according to the invention.

A nacelle 1 according to the invention as shown in FIG. 3 constitutes a tubular housing for a turbojet engine (not visible) for which it serves to channel the air flows it generates by defining inner and outer aerodynamic lines necessary to obtain optimal performances. It also houses various components necessary for the operation of the turbojet engine as well as connected systems, such as a thrust reverser.

The nacelle 1 is intended to be fastened to a fixed structure of an airplane, such as a wing 2, via a pylori 3.

More precisely, the nacelle 1 has a structure comprising an upstream air intake structure 4, a middle structure 5 surrounding a fan 7 of the turbojet engine, and a downstream section 6 surrounding the turbojet engine and generally housing a thrust reverser system (not shown).

The air intake structure 4 is divided into two zones. The first zone is an intake lip 4a adapted to allow optimal collection towards the turbojet engine of the air necessary to power the fan and internal compressors of the turbojet engine. The second zone is a section 4b further downstream than the air intake lip 4a comprising at least one outer panel 40. According to the invention, the lip 4a is incorporated into the outer panels 40 so as to form a single disassemblable piece.

The air intake structure 4 can be configurable and comprise a plurality of outer panels 40 each defining a corresponding air intake lip portion 4a.

The nacelle 1 according to the invention also comprises a middle structure 5 including a casing 9. The middle structure 5 is fastened to the air intake structure 4 so as to ensure aerodynamic continuity.

At least one inner panel 41 extends the air intake lip 4a. The inner panel(s) 41 is(are) intended to suitably channel the air towards the vanes (not shown) of the fan. The inner panel(s) 41 is(are) fixed by the downstream end thereof to an upstream end of the middle structure 5, in particular at the casing 9, via fastening clips. Thus, the inner panel(s) 41 form(s), with the middle structure 5, a structure that is fixed relative to the nacelle 1 of the invention. Moreover, the inner panel(s) 41 comprise(s) an acoustic shroud intended to attenuate the noise annoyance due to the operation of the turbojet engine and the vibrations of the structure. The acoustic shroud can be made up of a honeycomb structure or any other structure making it possible to attenuate the noise annoyance.

The nacelle 1 of the invention also comprises a means 15 for guiding the outer panel(s) 40 able to allow substantially rectilinear movement of the outer panel(s) 40 in the upstream direction of the nacelle 1 so as to be able to open the air intake structure 4 in a direction substantially parallel to the main direction of the guide means 15.

Figure 4:
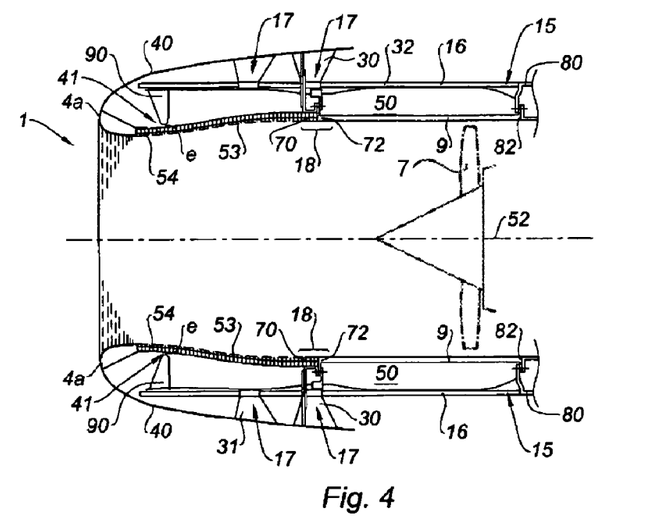
FIG. 4 is a diagrammatic illustration in longitudinal cross-section of a first embodiment of the air intake structure of FIG. 1 in the closed position.
Figure 5:
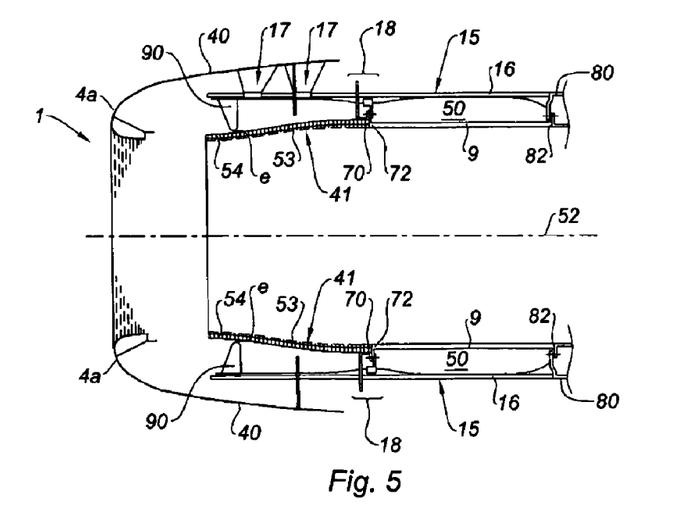
FIG. 5 is a diagrammatic illustration of the embodiment of FIG. 4 in the open position.

In the case shown in FIGS. 4 and 5, the guide means 15 is completely fixed, removably, on the middle structure 5 as described in application FR 07/09105. In this case, no part of the acoustic shroud is obstructed to allow fixing of the guide means 15 on the acoustic shroud. As a result, substantially the entire acoustic surface of the shroud can be used to attenuate the noise annoyance.

According to the embodiment illustrated in FIGS. 4 and 5, the guide means 15 comprises at least one system of rails 16 and means 17 for mounting the outer panel 40 movably on the system of rails 16. The elongated shape of the system of rails 16 makes it possible to perform a connecting function on the middle structure 5. Preferably, the guide means 15 comprises at least three guide rails 16 that are distributed radially. Typically the rail systems 16 are distributed substantially equidistantly, which makes it possible to balance the nacelle 1 according to the invention. The rail systems 16 are thus arranged around the support structure of the turbojet engine with the equipment necessary for the operation thereof on the periphery of the structure of the fan casing.

At least part of the mounting means 17 is situated downstream of the junction zone 18 of the middle structure 5 and the inner panel 41. As shown in FIG. 5, in the open position, such a configuration makes it possible to drive the outer panel 40 over a distance greater than or equal to the sum of the length of the junction zone 18 and the length of the inner panel 41, in order to more easily access the equipment housed inside the nacelle 1 of the invention.

The mounting means 17 as well as the system of rails 16 can have any shapes whatsoever suitable for allowing longitudinal movement of the mounting means 17 relative to the rail system 16. Examples of rail systems 16 comprise travelers on rails, a rail in a groove able to cooperate with a guideway system, a system of roller skids able to cooperate with a corresponding rail, and a longitudinal axis able to slide through a corresponding opening.

The guide means 15 can comprise a recess 50 substantially transverse relative to the axis 52 of the nacelle 1 of the invention, said recess 50 being situated downstream of the inner panel 41. Thus, the recess 50 makes it possible, for example, to bring elements of the turbojet engine of the hose and cable type in more easily way while also allowing movement of the air intake structure 4.

In the case where the inner panel 41 comprises an acoustic shroud 53, the latter part is generally fixed at its upstream end 54 to the air intake lip 4a by fixing means (not shown) such as bolts. Said fixing is done so that the inner panel 41 is in continuous contact with the air intake lip 4a when the aircraft is in operation, in particular during flight.

The interface between the air intake lip 4a incorporated into the outer panel 40 and the acoustic shroud 53 of the inner panel can itself be external or internal, but it must ensure the purest possible aerodynamic continuity. Rigid centering means, such as centering pins able to cooperate with corresponding bores, or flexible centering means, such as an elastic tab, ensure that structural continuity.

A sealing device can be positioned indifferently at the interface on either the inner 41 or outer 40 panel.

The inner panel 41 is fixed at its downstream end 70 to an upstream end 72 of the casing 9 using any means known by those skilled in the art, in particular via a flange. As a result, the inner panel 41 and the casing 9 form a fixed portion of the nacelle 1 according to the invention.

The downstream end 80 of the guide means is fixed, for example, to the downstream end 82 of the casing 9 using any means known by those skilled in the art.

The nacelle 1 of the present invention also comprises reinforcing means 90 configured to react the mechanical loads of the guide means 15 beyond a predetermined deformation thereof.

Preferably, the predetermined deformation is in at least one direction belonging to a plane substantially perpendicular to the main direction of the guide means 15. Typically, the main direction is substantially collinear to the axis 52 of the nacelle 1 of the invention. In the case of the rail system, the main direction corresponds substantially to the direction of the axis of the rails. In this case the rails are no longer aligned with the theoretical position thereof.

According to one preferred embodiment not shown, the reinforcing means 90 have, between them or with a member of the nacelle 1 of the invention, such as the inner panel 41, the outer panel 40 and the guide means 15, a non-zero space e in the idle position. "Idle position" here refers to the position in which the reinforcing means do not react the loads undergone by the guide means 15.

According to the present invention, the guide means 15 is subject to significant loads, the guide means 15 deforming relative to its main axis, in particular by becoming misaligned or buckling. The reinforcing means 90 then move to fill in the space e. Thus, there is a contact zone in case of excessive load on the guide means 15 without requiring the creation of an interface zone. Moreover, the loads are not transmitted from the guide means 15 to the middle structure 5, in particular the acoustic shroud 53 under flight conditions.

The contact zone in which the space e is null can be more or less flexible so as not to mark the interface through brutal and repeated loads when the structure is opened in case of gusts of wind, for example.

Figure 6:
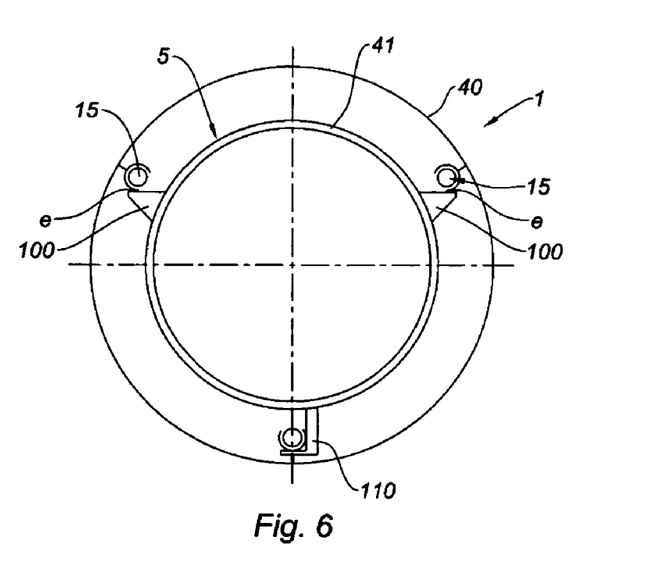
FIG. 6 is a diagrammatic transverse cross-section of the nacelle according to the invention.

According to one preferred embodiment shown in FIG. 6, the reinforcing means 100 comprise a protruding member fastened on the middle structure, in particular the inner panel 41, and having a non-zero space e with the guide means 15 in the idle position.

The reinforcing means 100 typically have a sensibly prismatic shape enabling easier manufacturing and mounting on the nacelle of the invention.

The reinforcing means 100 can be mounted directly on the acoustic shroud, in the guide means 15, or even both.

As shown in FIG. 6, the reinforcing means 110 are fastened on the inner panel 41, in particular the acoustic shroud 53, in the shape of an inverted L. In this embodiment, the guide means 110 has a non-zero spacing with the lateral portion of the L in the idle position. Thus, the portion of the reinforcing means 110 fastened on the middle structure 5 is reduced so as not to excessively impact the acoustic performance of the nacelle.

Moreover, it is possible for the reinforcing means to perform the support function for the guide means 15 at the upstream end to decrease the loads undergone by said means 15.

Figure 7:
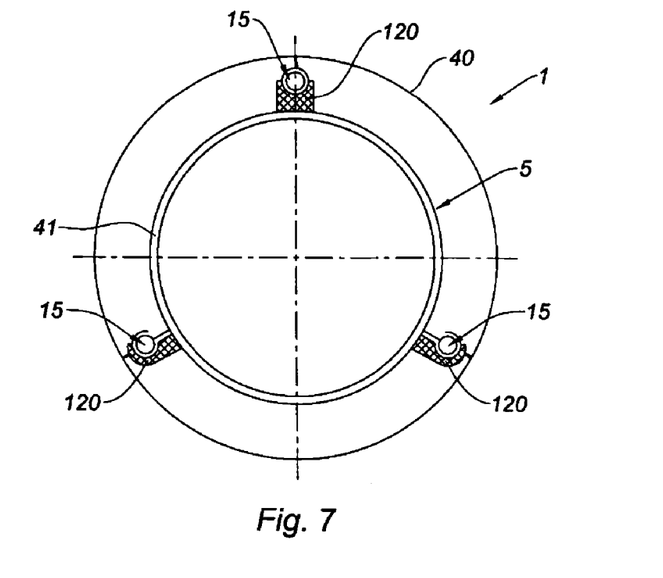
FIG. 7 is a diagrammatic transverse cross-section of an alternative of the nacelle of FIG. 6, FIGS. 8 to 13 are partial diagrammatic illustrations of a longitudinal cross-section of alternatives of the nacelle according to the invention.

According to another preferred embodiment shown in FIG. 7, the reinforcing means 120 have a load reacting portion with a shape substantially complementary to the guide means 15. The spacing of said portion is also non-null in the idle position with the guide means 15. Such an embodiment makes it possible to react loads in several directions of the space.

Figure 8:
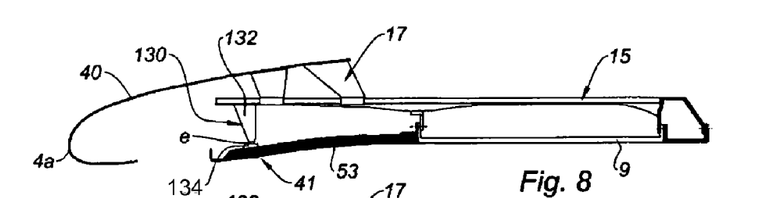
Figure 9:
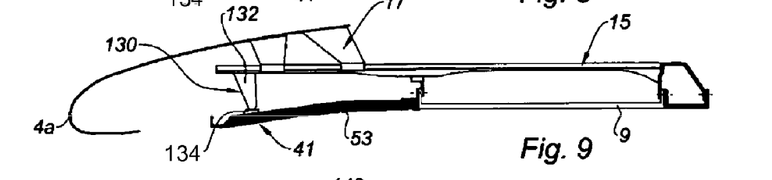

According to still another preferred embodiment shown in FIGS. 8 and 9, the reinforcing means 130 comprise a protruding member 132 fastened on the guide means 15 and a lug 134 fastened on the inner skin 41. The protruding member 132 is mounted substantially opposite the lug 134 with a non-zero spacing e in the idle position. As a result, this embodiment advantageously makes it possible to avoid structural fastening on the middle structure 5, in particular the acoustic shroud 53, to avoid altering the surface enabling the acoustic absorption.

The spacing e can be determined so that this spacing e is not null when the nacelle 1 of the invention is in the flight configuration.

The protruding member 132 can be fastened at the upstream end of the guide means so as to react the loads of the guide means 15 at the upstream end where the guide means most easily deform.

Figure 10:
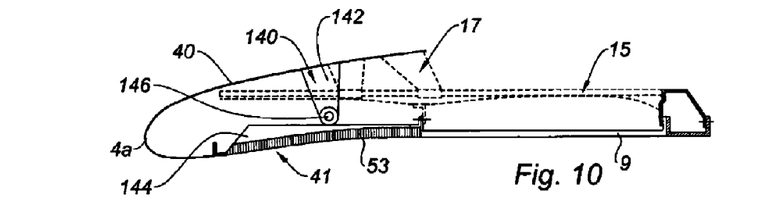
Figure 11:
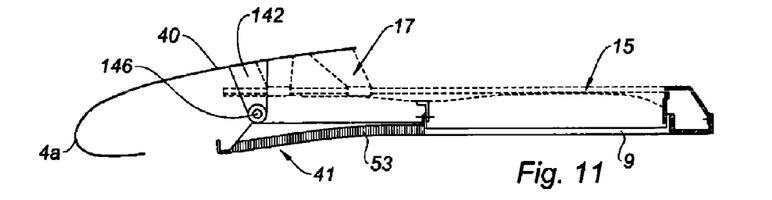

According to another preferred embodiment shown in FIGS. 10 and 11, the reinforcing means 140 comprise a first member 142 fixed on the outer panel 40 and able to move on a ramp 141 mounted on the inner panel 41. According to this advantageous embodiment, the reinforcing means 140 are not fixed on the guide means 15. The reinforcing means 140 can therefore substitute for a significant deformation of the guide means 14, in particular a possible buckling of the rails.

Typically, the first member 142 able to move on a ramp 141 is not in contact therewith when no deformation of the guide means 15 occurs.

According to still another alternative, the first member 142 and the ramp 144 can have a substantially null spacing e in order to accompany and support, during a maneuvering phase, the outer panel 40 relative to the inner panel 41, in particular the acoustic shroud 53. It is thus possible for the first member 142 and the ramp 144 to be in contact when no deformation of the guide means 15 occurs, but for the first member 142 to be able to deform by elasticity so as to react the mechanical loads after the predetermined maximum deformation.

The end 146 of the first member can include a roller able to roll on the ramp 144 to limit the friction in case of load during the movement of the outer panel 40.

The roller advantageously comprises an elastic member so as to stay in contact with the ramp 144, in particular in case of imperfection in the horizontally of the surface of the ramp 144.

The ramp 144 can comprise a slope or a bearing so as to reduce the deformation of the guide means 15. Such an embodiment makes it possible to further limit the deformation of the guide means 15 by reacting the loads before the predetermined maximum deformation.

Figure 12:
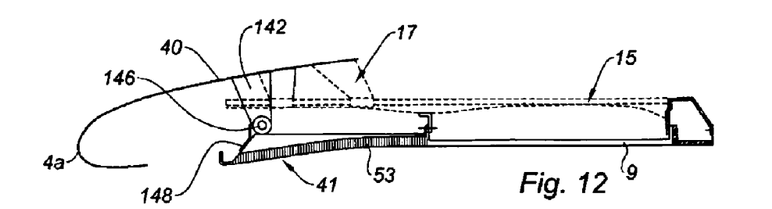

According to an embodiment shown in FIG. 12, the ramp 144 includes a stop 148 at the upstream end in order to prevent the end 146 of the first member from falling from the ramp 144 at the upstream end, still further damaging the guide means 15.

Figure 13:
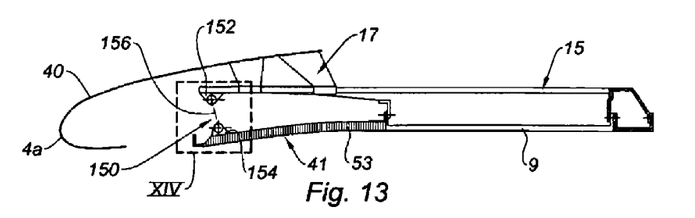
Figure 14:
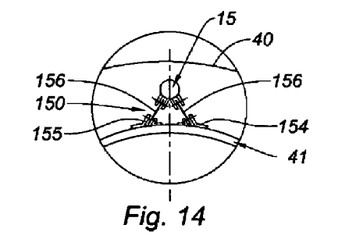
FIG. 14 is an enlargement of area XIV of FIG. 13.

According to an embodiment shown in FIG. 13, the reinforcing means 150 comprise a first stop member 152 mounted on the guide means 15 and at least one second stop member, in particular two 154 and 155, mounted on the inner panel 41. The first 152 and second 154 and 155 stop members being connected by a connecting means 156 able to deform to react the loads undergone by the guide means 15. Such an embodiment makes it possible to bear or take into account any movement of the guide means 15 coming from any direction whatsoever in the space.

The connecting means 156 can be adjustable so as to stress the guide means 15 and thereby prevent any hyperstatic assembly, i.e. an assembly stressed by a larger number of upper rigid fastening members relative to the three degrees of rotational freedom and the three degrees of translational freedom.

The connecting means 156 can be mounted at the upstream end of the guide means 15, forming an angle α1 and α2 along two axes substantially perpendicular to the main direction of the guide means 15.

Figure 15A:
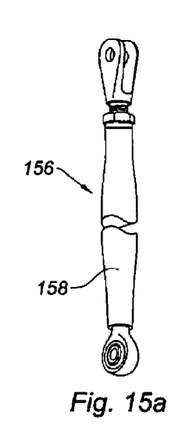
FIG. 15a is a partial perspective view of a connecting rod used in the reinforcing means of the nacelle of FIG. 13, FIGS. 15b to 15d are transverse cross-sections of alternatives of connecting rods used in the reinforcing means of the nacelle of FIG. 13.

Preferably, the connecting means 156 is a connecting rod 158, in particular adjustable (see FIG. 15a).

Figure 15B:
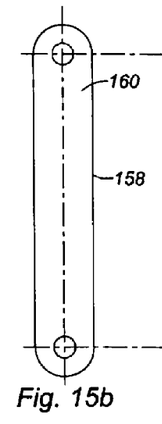

The connecting rod 158 can be formed by a single metal piece 160 so as not to alter the position of the guide means 15 and to directly react the loads undergone by the outer panel 40 (see FIG. 15b).

The connecting rod 158 can also comprise an elastically deformable member in order to absorb the loads undergone by the outer panel 40 while limiting, or even eliminating the deformation of the connecting rod.

Figure 15C:
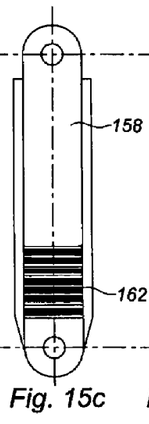
Figure 15D:
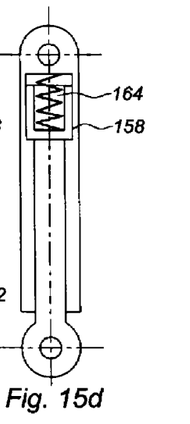

The elastically deformable member can thus be an elastomer member 162 and/or a spring 164 (see FIGS. 15c and 15d).

The invention claimed is:

1. A turbojet engine nacelle comprising:
   an air intake structure to channel a flow of air towards a fan of the turbojet engine and comprising at least one longitudinal outer panel incorporating an air intake lip;
   a middle structure surrounding said fan and to which the air intake structure is attached in such a way as to provide aerodynamic continuity;
   at least one inner panel comprising an acoustic shroud, fixed at a downstream end to an upstream end of the middle structure forming therewith a fixed structure of the nacelle;
   means of guiding the outer panel(s) to allow a substantially rectilinear movement of the outer panel in the upstream direction of the nacelle so as to open the air intake structure; and
   reinforcing means to react mechanical loads of the guide means beyond a predetermined deformation thereof as the air intake structure opens,
   wherein said reinforcing means only reacts the mechanical loads when a deformation of the guide means occurs.

2. The nacelle according to claim 1, wherein the predetermined deformation is in at least one direction belonging to a plane substantially perpendicular to a main direction of the guide means.

3. The nacelle according to claim 1, wherein the reinforcing means have, between them or with an element of the nacelle, a non-zero spacing in an idle position.

4. The nacelle according to claim 3, wherein the reinforcing means comprise a protruding member fastened on the inner panel and having a non-zero spacing with the guide means in the idle position.

5. The nacelle according to claim 1, wherein the reinforcing meansare fastened on the inner panel in the shape of an inverted L, the guide means having a non-zero spacing with the lateral portion of the L in an idle position.

6. The nacelle according to claim 1, wherein the reinforcing means have a load reacting portion with a shape substantially complementary to the guide means, said portion having a non-zero spacing in an idle position with the guide means.

7. The nacelle according to claim 1, wherein the reinforcing means comprise a protruding member fastened on the guide means and a lug fastened on the inner panel, said protruding member being mounted opposite the lug with a non-zero spacing in an idle position.

8. The nacelle according to claim 1, wherein the reinforcing means comprise a first member fixed on the outer panel and able to move on a ramp mounted on the inner panel.

9. The nacelle according to claim 8, wherein the end comprises a roller able to roll on the ramp.

10. The nacelle according to claim 8, wherein the ramp comprises a stop at the upstream end.

11. The nacelle according to claim 1, wherein the reinforcing means comprise a first stop member mounted on the guide means and at least one second stop member mounted on the inner panel, said first and second stop members being connected using a connection capable of deforming to react the loads undergone by the guide means.

12. The nacelle according to claim 11, wherein the connecting means is a connecting rod.

13. The nacelle according to claim 12, wherein the connecting rod is formed from a metal piece.

14. The nacelle according to claim 12, wherein the connecting rod comprises an elastically deformable member.

* * * * *